United States Patent
Musuvathi et al.

(10) Patent No.: US 7,596,534 B2
(45) Date of Patent: Sep. 29, 2009

(54) COMPUTER IMPLEMENTED METHODS FOR SOLVING DIFFERENCE AND NON-DIFFERENCE LINEAR CONSTRAINTS

(75) Inventors: Madanlal S. Musuvathi, Bellevue, WA (US); Shuvendu K. Lahiri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 545 days.

(21) Appl. No.: 11/455,308

(22) Filed: Jun. 15, 2006

(65) Prior Publication Data
US 2007/0294196 A1 Dec. 20, 2007

(51) Int. Cl.
*G06N 5/00* (2006.01)
(52) U.S. Cl. .................................. 706/19; 706/45
(58) Field of Classification Search .................. 706/19, 706/14, 45, 46
See application file for complete search history.

(56) References Cited

U.S. PATENT DOCUMENTS

| | | | |
|---|---|---|---|
| 4,885,686 | A | 12/1989 | Vanderbei |
| 5,905,666 | A | 5/1999 | Hoffman et al. |
| 6,895,421 | B1 | 5/2005 | Dor et al. |
| 2003/0074652 | A1 | 4/2003 | Harrison, III et al. |
| 2004/0049474 | A1 | 3/2004 | Shankar et al. |
| 2004/0060007 | A1 | 3/2004 | Gottlob et al. |
| 2004/0109613 | A1 | 6/2004 | Guleryuz |
| 2004/0181460 | A1 | 9/2004 | Bjelogrlic et al. |
| 2005/0229091 | A1 | 10/2005 | Narayanan et al. |

FOREIGN PATENT DOCUMENTS

| | | |
|---|---|---|
| CA | 2406822 | 4/2004 |
| GB | 1362910 | 8/1974 |
| WO | WO2006000027 A1 | 1/2006 |

OTHER PUBLICATIONS

Nitin Chandrachoodan et al., Adaptive Negative Cycle Detection in Dynamic Graphs, 2001, IEEE, V163-V-166.*
Rueb et al., Solving Linear Arithmetic Constraints, Jan. 15, 2004, Sri International, Technical Report CSL-SRI-04-1.*
Lahirl et al, Solving Sparse Linear Constraints, no date given, Microsoft Research, 1-23.*
Badros et al., "The Cassowary Linear Arithmetic Constraint Solving Algorithm: Interface and Implementation," Technical Report UW-CSE-98-06-04, Dept. of Computer Science and Engineering, Jun. 29, 1998 http://www.cs.washington.edu/research/constraints/cassowary/cassowary-tr.pdf.
Rueb et al., "Solving Linear Arithmetic Constraints," SRI International, CSL Tehnical Report CSL-SRI-04-1, Jan. 15, 2004 http://www.csl.sri.com/users/ruess/papers/SlackpaperTr/slackpaperTr.pdf.

(Continued)

*Primary Examiner*—Wilbert L Starks, Jr.
(74) *Attorney, Agent, or Firm*—Vierra Magen Marcus & DeNiro LLP

(57) ABSTRACT

A computer implemented method for solving linear arithmetic constraints that combines a solver for difference constraints with a general linear arithmetic constraint solver. When used to solve sparse linear arithmetic constraints, the time and space complexity of the process is determined by the difference constraint component.

19 Claims, 4 Drawing Sheets

OTHER PUBLICATIONS

"What's New in MATHEMATICA5" http://www.media.wolfram.com/notebooks/newin5.pdf.

Toledo, "A Survey of Out-of-Core Algorithms in Numerical Linear Algebra," DIMACS Series in Discrete Mathematics and Theoretical Computer Science, 2000 http://www.cs.tau.ac.il/~stoledo/Pubs/oocsurvey.pdf.

Murray et al., "An Improved FOCUSS-Based Learning Algorithms for Solving Sparse Linear Inverse Problems," Electrical and Computer Engineering, University of California, San Diego http://dsp.ucsd.edu/~kreutz/Murrary2001b.pdf.

Sheini et al., "A Scalable Method for Solving Satisfiability of Integer Linear Arithmetic Logic," Dept. of Electrical Engineering and Computer Science, Springer-Verlag Berlin Heidelberg 2005.

Ball et al., "Zap: Automated Theorem Proving for Software Analysis," Microsoft Corporation,Technical Report MSR-TR-2005-137, Oct. 8, 2005.

Detlefs et al., "Simplify: A Theorem Prover for Program Checking," Jul. 16, 2003.

Lahiri et al., "An Efficient Nelson-Oppen Decision Procedure for Difference Constraints over Rationals," Microsoft Corporation, Technical Report MSR-TR-2005-61, May 26, 2005.

Pratt, "Two Easy Theories Whose Combination is Hard," M.I.T., Sep. 1, 1977.

Rueb et al., "Solving Linear Arithmetic Constraints," SRI International, Mar. 4, 2005.

Lahiri et al., "Solving Sparse Linear Constraints," Microsoft Research.

\* cited by examiner

COMPUTER IMPLEMENTED METHODS FOR SOLVING DIFFERENCE AND NON-DIFFERENCE LINEAR CONSTRAINTS

BACKGROUND

A significant objective of program analysis and verification is to determine that the software performs its intended functions correctly, to ensure that it performs no unintended functions, and to provide information about its quality and reliability. Theorem proving in the form of constraint solving is an important application for software analysis and verification. Many program analysis and verification tasks involve checking the satisfiability of a set of integer linear arithmetic constraints. These constraints appear naturally during reasoning about arrays and scalar counters in programs. Moreover, these queries usually contain a mixture of other theories (e.g., uninterpreted functions) and quantifiers, in addition to linear arithmetic constraints.

As the problem of checking the satisfiability of a set of integer linear arithmetic constraints is NP-complete, there is a practical need to develop algorithms that effectively solve the instances of the problem that occur in practice. These algorithms should also be designed to operate in a setting where the queries involve a combination of ground theories, and possibly quantifiers.

In most verification benchmarks, the linear arithmetic constraints are dominated by simple difference constraints of the form $x \leq y+c$, where x and y are variables and c is a constant. These constraints naturally arise in many applications. For instance, the array bounds' check in a program and the timing constraints in job scheduling can be specified as difference constraints. It has also been observed that many of the arithmetic constraints that arise in verification or program analysis mostly comprise difference constraints.

Efficient polynomial algorithms exist for solving the satisfiability of difference constraints. For a given theory T, a decision procedure for T checks if a formula $\phi$ in the theory is satisfiable, i.e., it is possible to assign values to the symbols in $\phi$ that are consistent with T, such that $\phi$ evaluates to true. However, these algorithms become incomplete with the presence of even a very few non-difference constraints. A set of linear arithmetic constraints may be defined as sparse linear arithmetic ("SLA") constraints, when the fraction of non-difference constraints is very small compared to the fraction of difference constraints. SLA constraints make it difficult to exploit the efficiency of difference constraint solvers for solving many program analysis queries. At present, there is a need for efficient algorithms for solving SLA constraints.

Moreover, decision procedures currently do not operate in isolation, but form a part of a more complex system that can decide formulas involving symbols shared across multiple theories. In such a setting, a decision procedure has to support the following operations efficiently:

(i) Satisfiability Checking: Checking if a formula $\phi$ is satisfiable in the theory;
(ii) Model Generation: If a formula in the theory is satisfiable, find values for the symbols that appear in the theory that makes it satisfiable. This is important for applications that use theorem provers for test-case generation;
(iii) Equality Generation: The Nelson-Oppen framework for combining decision procedures requires that each theory produces the set of equalities over variables that are implied by the constraints;
(iv) Proof Generation: Proof generation can be used to certify the output of a theorem prover. Proofs are also used to construct conflict clauses efficiently in a lazy SAT-based theorem proving architecture.

A set of general linear arithmetic constraints can be solved using the Simplex algorithm. The Simplex algorithm is a known technique for numerical solution of the linear programming problem. The method uses the concept of a simplex, which is a polytope of N+1 vertices in N dimensions, e.g., a line segment on a line, a triangle on a plane, a tetrahedron in three-dimensional space and so forth. Details relating to the Simplex algorithm are set forth in G. Dantzig, "Linear programming and extensions," Princeton University Press, Princeton N.J., 1963, which publication is incorporated by reference herein in its entirety.

Under the theory of difference constraints defined above, the atomic formula may be expressed as $x_1 - x_2 \bowtie c$, where $x_1, x_2$ are variables, c is a constant and $\bowtie$ is a placeholder for an operand $\{\leq, \geq, =\}$. Constraints of the forms $x \bowtie c$ may be converted to the above form by introducing a special vertex $x_{orig}$ to denote the origin, and expressing the constraint as $x - x_{orig} \bowtie c$. The resultant system of difference constraints is equisatisfiable with the original set of constraints. Moreover, if $\rho$ satisfies the resultant set of difference constraints, then a satisfying assignment $\rho'$ to the original set of constraints (that include $x \bowtie c$ constraints) can be obtained by assigning $\rho'(x) \dot{=} \rho(x) - \rho(x_{orig})$, for each variable. A set of difference constraints (both over integers and rationals) can be decided in polynomial time using negative cycle detection ("NCD") algorithms. These NCD algorithms detect negative weight cycles in a directed graph.

Thus, algorithms exist for solving difference constraints using linear space. However, these solutions cannot be used to solve general linear arithmetic including both difference constraints and non-difference constraints.

SUMMARY

The present system relates to a computer implemented process for an efficient decision procedure for SLA constraints. The process combines a solver for difference constraints with a solver for general linear constraints. In general, the process may operate according to the follow steps. The process first checks the satisfiability of $\phi_D$ using a negative cycle detection algorithm. If $\phi_D$ is unsatisfiable, the process returns unsatisfiable. Otherwise, SP(x,y) is used to describe the length of the shortest path from the (vertices corresponding to) variable x to y in the graph induced by $\phi_D$. The set of difference constraints may then be generated over Q:

$$\phi_Q \dot{=} \wedge \{y - x \leq d | x \in Q, y \in Q, SP(x, y) = d\}.$$

The process next checks the satisfiability of $\phi_L \wedge \phi_Q$ using a linear arithmetic decision procedure. If $\phi_L \wedge \phi_Q$ is unsatisfiable, then the process returns unsatisfiable. Otherwise, $\rho_L$ is a satisfying assignment for $\phi_L \wedge \phi_Q$ over L.

Lastly, the process generates a satisfying assignment $\rho_D$ to the formula $\phi_D \wedge \wedge x \in Q$ ($x = \rho L(x)$), using a negative cycle detection algorithm. $\rho_x \dot{=} \rho_d \circ \rho_L$ is returned as a satisfying assignment for $\phi$.

The process for SLA constraints according to the present system may be implemented within a computing environment, and may provide a result which may be stored within and reported by the computing environment. As used herein, reporting the results may include, but is not limited to, displaying the results over a monitor associated with the computing environment, printing the results with a printer associated with the computing environment, sending the results to a speaker associated with the computing environment, communicating the result over a transmission medium, and sending the results to a file for storage or use by another application program.

An unsatisfiable state is returned only when a set of constraints implied by φ is detected to be unsatisfiable. To show that the process is complete (for both integer and rational arithmetic), it can be seen that if $\phi_D$ and $\phi_L \wedge \phi_Q$ are each satisfiable, then φ is satisfiable. This is achieved by showing that a satisfying assignment $\rho_L$ for $\phi_L \wedge \phi_Q$ can be extended to an assignment $\rho_x$ for φ, such that φ is satisfiable.

The resulting process enjoys polynomial complexity, or near polynomial complexity, and linear space, when the number of non-difference constraints is small. Given m difference constraints over n variables, the complexity of the negative cycle detection algorithm may be denoted NCD(n, m). The space complexity for NCD(n, m) is O(n+m), and the upper bound of the time complexity is O(n.m), although many algorithms have a better complexity. Similarly, with m constraints over n variables, the complexity of the linear arithmetic procedure under consideration may be denoted LAP(n,m). For example, if Simplex is used as the (rational) linear arithmetic decision procedure, then the space complexity for LAP(n,m) is O(n,m) and the time complexity is polynomial in n and m in practice.

The combined solvers can also be extended to generate implied equalities over variables that are implied by the constraints. In addition, the decision procedure generates models for satisfiable formulas.

DETAILED DESCRIPTION

Figure 1:
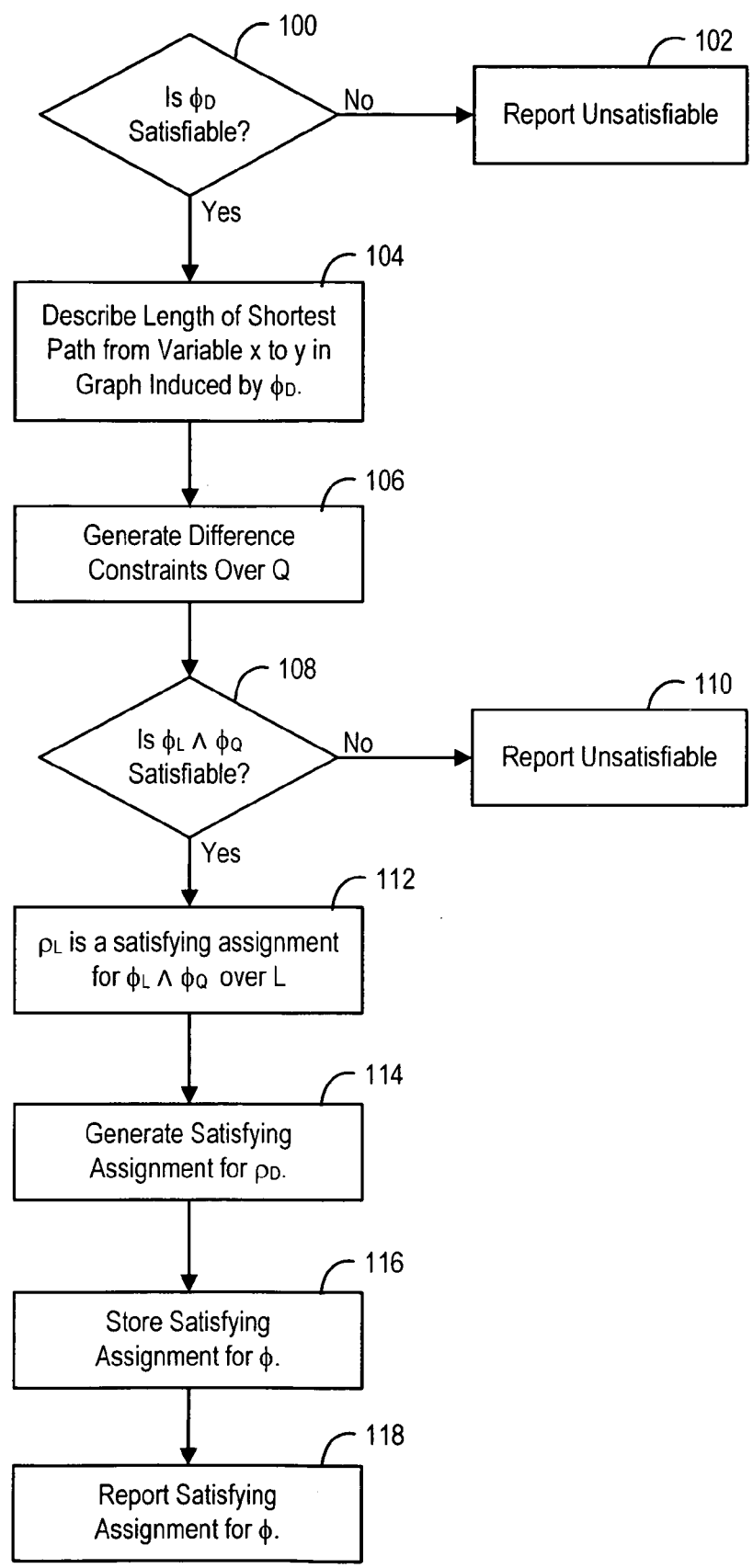
FIG. 1 is a flowchart for solving linear arithmetic constraints that combine a solver for difference constraints with a general linear arithmetic constraint solver.
Figure 2:
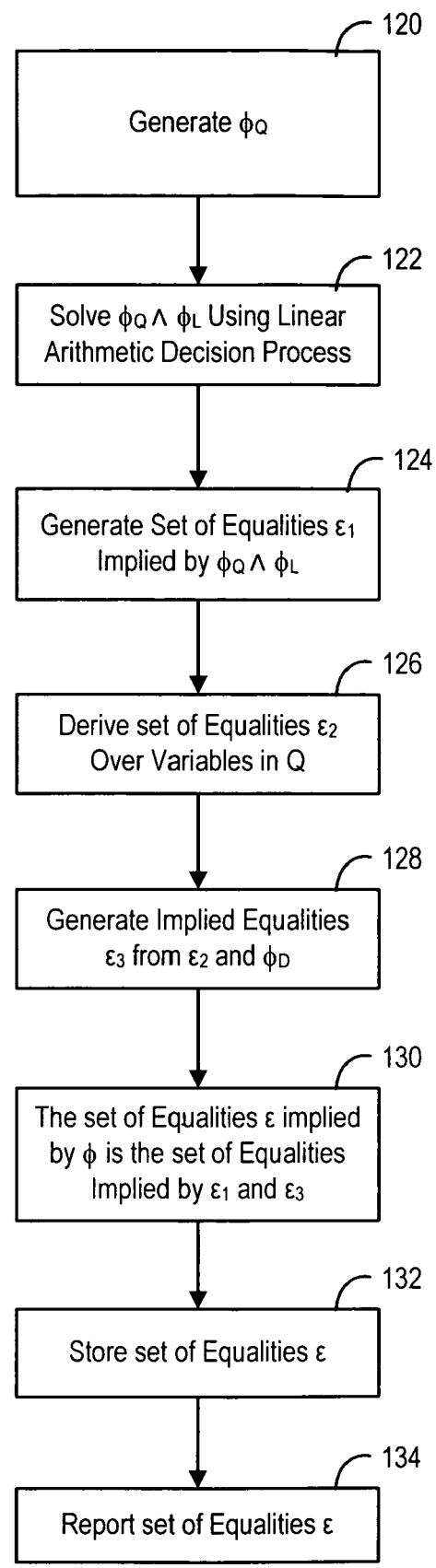
FIG. 2 is a flowchart for generating a set of equalities between variables implied by the constraint φ.

Embodiments of the present system will now be described with reference to FIGS. 1 through 3B, which in general relate to a computer implemented method for solving sparse linear arithmetic constraints. Following is an introduction to the principles utilized in embodiments of the present system. Following that is a description of the embodiments of the present system.

By way of introduction, most queries that arise in software verification are dominated by difference constraints. For example, more than 95% of the linear arithmetic constraints are restricted to difference constraints for a set of program verification benchmarks. Difference constraints are a restricted class of linear arithmetic constraints of the form $x \bowtie y+c$, where x and y are variables, c is a constant and $\bowtie$ is a placeholder for an operand $\{\leq, \geq, =\}$. In embodiments of the present system, decisions procedures are devised for sparse linear arithmetic ("SLA") constraints including both difference and non-difference constraints.

There are well-known, efficient decision procedures for difference constraints. Given a set of difference constraints, one can reduce the problem of checking its satisfiability to the problem of detecting negative cycles in an appropriately generated graph. Then, any of the negative-cycle-detection algorithms can be used to decide the given constraints. For instance, the classic Bellman-Ford algorithm can decide m difference constraints on n variables in O(n.m) time and O(n+m) space complexity. Other algorithms may improve the running time to $O(n^{2.5})$. All these algorithms also generate a satisfying assignment to the variables in the constraints if one exists. Previously, a negative cycle detection algorithm has been extended to generate equalities over variables for difference constraints, without significant effect on the complexity of the algorithm. See, S. K. Lahiri and M. Musuvathi, "An Efficient Nelson-Oppen Decision Procedure for Difference Constraints over Rationals," *Proceedings of the Third Workshop on Pragmatics of Decision Procedures in Automated Reasoning* (*PDPAR* 2005), 144(2):27-41, 2005, which publication is incorporated by reference herein in its entirety.

The following is a high-level description of some notations and theorem provers based on the Nelson-Oppen combination. An expression in the logic can either be a term or a formula. A term can either be a variable or an application of a function symbol to a list of terms. A formula can be the constants true or false or an atomic formula or Boolean combination of other formulas. Atomic formulas can be formed by an equality between terms or by an application of a predicate symbol to a list of terms. A literal is either an atomic formula or its negation. A conjunction of literals may be identified as $I_1 \wedge I_2 \ldots I_k$ with the set $\{I^1, \ldots, I_k\}$.

The function and predicate symbols can either be uninterpreted or can be defined by a particular theory. For instance, the theory of integer linear arithmetic defines the function-symbol "+" to be the addition function over integers and "<" to be the comparison predicate over integers. For a theory T, the signature Σ denotes the set of function and predicate symbols in the theory. If an expression E involves function or predicate symbols from two (or more) theories $T_1$ and $T_2$, then E is said to be an expression over a combination of theories $T_1 \cup T_2$.

A formula F is said to be satisfiable if it is possible to assign values to the various symbols in the formula from the domains associated with the theories to make the formula true. A formula is valid if ¬ F is not satisfiable. Formula A is said to imply a formula B (A⇒B) if and only if (¬A)∨B is valid. A satifiability procedure for Σ-theory T checks if a formula φ (over Σ) is satisfiable in T.

A decision procedure for a set of constraints in linear arithmetic (or its subset like difference logic) can either be used in isolation, or more often to solve a set of constraints over a combination of theories including linear arithmetic. For the latter case, Nelson and Oppen provided a framework for deciding formulas over multiple theories by modularly combining decision procedures for the different theories. Their framework is described in a paper: G. Nelson and D. C. Oppen, "Simplification by cooperating decision procedures," *ACM Transactions on Programming Languages and Systems*, (*TOPLAS*), 2(1):245 257, 1979, which paper is incorporated by reference herein in its entirety.

In general, given two convex and stably infinite theories $T_1$ and $T_2$ with disjoint-signatures $\Sigma_1$ and $\Sigma_2$ respectively (i.e. $\Sigma_1 \cap \Sigma_2 = \{\ \}$), and a conjunction of literals φ over $\Sigma_1 \cup \Sigma_2$, the goal is to find whether φ is satisfiable under $T_1 \cup T_2$. Nelson and Oppen provided a method for modularly combining the satisfiability procedures for $T_1$ and $T_2$ to produce a satisfiability procedure for $T_1 \cup T_2$.

The Nelson-Oppen procedure in general works as follows: The input φ is split into the $\phi_1$ and $\phi_2$ such that $\phi_i$ only contains symbols from $\Sigma_i$ and $\phi_1 \wedge \phi_2$ is equisatisfiable with $\phi$. Each theory $T_i$ decides the satisfiability of $\phi_i$ and returns unsatisfiable if $\phi_i$ is unsatisfiable in $T_i$. Otherwise, the set of equalities implied by $\phi_i$ over the variables common to $\phi_1$ and $\phi_2$ are propagated to the other theory $T_j$. The theory $T_j$ adds these equalities to $\phi_j$ and the process is repeated until the set of equalities saturate.

Therefore, in addition to checking the satisfiability of a set of literals, each theory also has to derive all the equalities over variables that are implied by the set of literals. The satisfiability procedure is called equality generating if it can generate all such equalities.

If the formula $\phi_i$ is satisfiable, then theory $T_i$ can generate satisfying assignments for the variables and symbols in $\phi_i$. If each theory can generate diverse assignments for the shared variables, then a satisfying assignment may be generated for the symbols and variables in $\phi$. As explained hereinafter, aspects of the process of the present system are directed to generating equalities and satisfying assignments for general linear arithmetic covering both difference constraints and non-difference constraints.

Moving now to the concept of Lazy Theorem proving, in order to check the satisfiability of a formula $\psi$ with arbitrary Boolean structure, many modern theorem provers use an encoding of $\psi$ into a Boolean formula, and use a Boolean Satisfiability (SAT) solver to check the satisfiability of the Boolean formula. In particular, the formula $\psi$ is checked using a Boolean SAT solver, after treating each atomic formula as a Boolean variable. If the SAT solver determines that the formula is unsatisfiable, then $\psi$ is unsatisfiable. Otherwise, the satisfying assignment from SAT $\phi$ (a conjunction of literals from $\psi$) is checked for satisfiability using the Nelson-Oppen combination procedure described in the last section. If $\phi$ is satisfiable over the first-order theories, the formula $\psi$ is satisfiable.

Embodiments of the present system will now be described with reference to FIGS. 1-4. The process for SLA constraints according to the present system may be implemented within a computing environment 200 as explained below with reference to FIG. 4, and may provide a result which may be stored within and reported by the computing environment. As used herein, reporting the results may include, but is not limited to, displaying the results over a monitor associated with the computing environment, printing the results with a printer associated with the computing environment, sending the results to a speaker associated with the computing environment, communicating the result over a transmission medium, and sending the results to a file for storage or use by another application program.

In the following description, $\phi \doteq \wedge_i(\Sigma_j a_{i,j} * x_j \leq c_i)$ is the conjunction of a set of integer or rational linear arithmetic constraints over a set of variables X. The set of constraints is partitioned in $\phi$ into the set of difference constraints $\phi_D$ and the non-difference constraints $\phi_L$, such that $\phi = \phi_D \wedge \phi_L$. In the following description, D is the set of variables that appear in $\phi_D$, L is the set of variables that appear in $\phi_L$ and Q is the set of variables in $D \cap L$. The variable $x_{orig}$ is assumed to denote the origin, always belonging to D, and any $x \bowtie c$ constraint has been converted to $x \bowtie x_{orig} + c$.

A set of constraints $\phi$ is defined to be SLA constraints if the fraction $|L|/|D| \ll 1$, for example on the order of 0.05. This also implies that $|Q|/|D| \ll 1$. According to embodiments of the present system, an efficient decision procedure is devised for SLA constraints, such that the complexity is polynomial in D but, in embodiments, exponential only over L. This is useful for solving integer linear constraints, where the complexity of the decision problem is NP-complete. For rational linear arithmetic, the procedure will still retain its polynomial complexity, but will improve the robustness on practical benchmarks by mitigating the effect of the general linear arithmetic solver.

In embodiments, an process is further provided for checking the satisfiability of a set of SLA constraints that has polynomial complexity in the size of the difference constraints. Moreover, the space complexity of the process is almost linear in the size of the difference constraints. Finally, assuming there is a decision procedure for integer linear arithmetic that generates satisfying assignments, the process can generate an integer solution when the input SLA formula is satisfiable over integers.

In the following description, $\phi$ is a set of linear arithmetic constraints as above, and Q is the set of variables common to the difference constraints $\phi_D$ and non-difference constraints $\phi_L$. The SLA-SAT process according to embodiments of the present system is a decision procedure for (integer and rational) linear arithmetic. Moreover, it also generates a satisfying assignment when the constraints are satisfiable.

Embodiments of the SLA-SAT process operate according to the steps shown in FIG. 1. In step 100, the process checks the satisfiability of $\phi_D$ using a negative cycle detection algorithm.

In step 102, if $\phi_D$ is unsatisfiable, the process reports an unsatisfiable result. As indicated, the reporting step may include but is not limited to, displaying that the result is unsatisfiable over a monitor associated with the computing environment, printing that the result is unsatisfiable with a printer associated with the computing environment, sending the result to a speaker associated with the computing environment, communicating that the result is unsatisfiable over a transmission medium, and sending the fact of an unsatisfiable result to a file for storage or use by another application program.

If $\phi_D$ is instead unsatisfiable, in a step 104, SP(x,y) is used to describe the length of the shortest path from the (vertices corresponding to) variable x to y in the graph induced by $\phi_D$. In a step 106, the set of difference constraints is generated over Q:

$$\phi_Q \doteq \wedge \{y - x \leq d | x \in Q, y \in Q, SP(x, y) = d\}, \quad (1)$$

In step 108, the process checks the satisfiability of $\phi_L \wedge \phi_Q$ using a linear arithmetic decision procedure. If $\phi_L \wedge \phi_Q$ is unsatisfiable, then the process reports an unsatisfiable result in step 110. Otherwise, $\rho_L$ is a satisfying assignment for $\phi_L \wedge \phi_Q$ over L (step 112).

In step 114, the process generates a satisfying assignment $\rho_D$ to the formula $\phi_D \wedge \wedge x \in Q$ $(x = \rho L(x))$, using a negative cycle detection algorithm. In step 116, $\Sigma_x \doteq \rho_D \circ \rho_L$ is returned as a satisfying assignment for $\phi$.

The satisfying assignment for $\phi$ may be stored by the computing system environment in step 116, and reported in step 118. As indicated above, reporting the results may include, but is not limited to, displaying the results over a monitor associated with the computing environment, printing the results with a printer associated with the computing environment, sending the results to a speaker associated with the computing environment, communicating the result over a transmission medium, and sending the results to a file for storage or use by another application program.

An unsatisfiable state is returned only when a set of constraints implied by $\phi$ is detected to be unsatisfiable. To show that the process is complete (for both integer and rational arithmetic), it can be seen that if $\phi_D$ and $\phi_L \wedge \phi_Q$ are each satisfiable, then $\phi$ is satisfiable. This is achieved by showing that a satisfying assignment $\rho_L$ for $\phi_L \wedge \phi_Q$ can be extended to an assignment $\rho_x$ for $\phi$, such that $\phi$ is satisfiable.

The following Lemma 1 demonstrates that if the assignment $\rho_L$ over L satisfies $\phi_L \wedge \phi_Q$, then the assignment $\rho_x$ over X satisfies $\phi$.

Lemma 1:

First, for any variable $x \in Q$, $\rho_D(x) = \rho_L(x)$, since $\rho_D$ has to satisfy $\wedge_{x \in Q}(x = \rho_L(x))$. Hence, if it can be shown that in Step 114, $\phi_D \wedge \wedge_{x \in Q}(x = \rho_L(x))$ is satisfiable, then $\rho_x$ satisfies $\phi_D$ and $\phi_L$.

Assume that $\psi \doteq [\phi_D \wedge \wedge_{x \in Q}(x = \rho_L(x))]$ is unsatisfiable. Consider the graph $G\psi(V,E)$ induced by the formula $\psi$ (as described in Section 2): First, add an edge for each constraint in $\Phi_D$. Secondly, each constraint $x = \rho_L(x)$, is broken up into a pair of constraints $x - x_{orig} \leq \rho_L(x)$ and $x_{orig} - x \leq -\rho_L(x)$, and then the corresponding edges are added to the graph. Let $T \subseteq E$ be the set of edges in $G\psi$ resulting from the addition of edges for all the $x = \rho_L(x)$ constraints.

Since $\psi$ is unsatisfiable, there has to be a (simple) cycle C with negative weight in the graph. Moreover, it is known that $\phi_D$ is satisfiable. Therefore, the negative cycle contains at least one edge from T. Since C is a simple cycle, at most two edges from T can be present in C. Let the edges in C be $[(x_{orig}, x_1), (x_1, x_2), \ldots, (x_k, x_{orig})]$. Let $w_1, w_2, \ldots, w_{k+1}$ be the weights of these edges in C, such that $\Sigma_i w_{i \in [1, k+1]} < 0$.

Assume further that C contains exactly one edge $t \in T$, such that either $(x_{orig}, x_1)$ or $(x_k, x_{orig})$ belong to T. The two subcases are as follows:

1. Let $(x_k, x_{orig}) \in T$, representing the constraint $x_{orig} - x_k \leq w_{k+1}$. This means that the constraint $x_{orig} - x_k = w_{k+1}$ or otherwise $\rho_L(x_k) = -w_{k+1}$, is present in $\psi$. Since C forms a negative cycle, $\Sigma_i w_{i \in [1,k]} < -w_{k+1}$. Therefore, there is a path from $x_{orig}$ to $x_k$ in $G\psi$ (without any T edges) with a weight less than $-w_{k+1}$. This implies that the constraint $x_k - x_{orig} < -w_{k+1}$, or equivalently $x_k < -w_{k+1}$, was implied by $\phi_D$, and therefore was implied by $\phi_Q$. Since $\rho_L$ satifies $\phi_Q$, this leads to a contradiction.

2. Let $(x_{orig}, x_1) \in T$, meaning that $\rho L(x_1) = w_1$. By a reasoning similar to the previous subcase, it can be shown that the graph $G\psi$ (without any T edges) implies the constraint $x_1 > w_1$, which leads to a contradiction.

In the case when both $(x_{orig}, x_1)$ and $(x_k, x_{orig})$ belong to T, this means that $\rho_L(x_1) = w_1$, and $\rho_L(x_k) = -w_{k+1}$. However, C implies that there is a path from $x_1$ to $x_k$ of length $\Sigma_i w_{i \in [2,k]} < -w_1 - w_{k+1}$, implying $x_k - x_1 < -w_1 - w_{k+1}$. This contradicts with the assignment $\rho_L$, since $\Phi_Q$ should imply $x_k - x_1 < -w_1 - w_{k+1}$.

This completes the proof.

If all the coefficients and constants in $\phi$ are integral, and $\rho_L$ is integral, then the assignment $\rho_x$ assigns integral values to X. This is because the negative cycle detection algorithms assign integral values when the edge weights are integral.

Since a model for $\phi_Q$ can be extended to be a model for $\phi_D$, Lemma 1 also shows another corollary: where $P \doteq D \setminus Q$ is the set of variables local to $\phi_D$, then $\phi_Q \Leftrightarrow (\exists P: \phi_D)$. The corollary holds that $\phi_Q$ is the result of quantifier elimination of the variables $D \setminus Q$ local to $\phi_D$. Hence, for any constraint $\psi$ over Q, $\phi_D \Rightarrow \psi$ if and only if $\phi_Q \Rightarrow \psi$.

Given m difference constraints over n variables, the complexity of the negative cycle detection algorithm may be denoted NCD(n, m). The space complexity for NCD(n, m) is O(n+m), and the upper bound of the time complexity is O(n.m), although many algorithms have a better complexity. Similarly, with m constraints over n variables, the complexity of the linear arithmetic procedure under consideration may be denoted LAP(n,m). For example, if Simplex is used as the (rational) linear arithmetic decision procedure, then the space complexity for LAP(n,m) is O(n,m) and the time complexity is polynomial in n and m in practice. Finally, for a set of constraints $\psi$, $|\psi|$ denotes the number of constraints in $\psi$.

The following describes the complexity of the SLA-SAT procedure shown in the flowchart of FIG. 1. Step 100 takes NCD($|D|$, $|\Phi_D|$) time and space complexity. Step 104 requires generating shortest paths between every pair of variables $x \in Q$ and $y \in Q$. This can be obtained by using a variant of Johnson's algorithm for generating all-pair-shortest-paths for a graph G(V, E). See, T. H. Cormen, C. E. Leiserson, and R. L. Rivest, *Introduction to Algorithms*, MIT Press, 1990, which publication is incorporated by reference herein in its entirety. The process has linear space complexity O($|V|+|E|$) in V and E. Assuming a negative cycle detection algorithm has already performed, the time complexity of the process is O($|V|^2 \cdot \log(|V|)$).

Instead of generating all-pair-shortest-paths for every pair of vertices using Johnson's algorithm, the SLA-SAT process may be used to compute the shortest path from a subset $V' \subseteq V$ to every other vertices. This makes the time complexity of the process O($|V^1| \cdot |V| \cdot \log(|V|)$) from O($|V|^2 \cdot \log(|V|)$). Since Step 100 already performs a negative cycle detection algorithm, and the shortest paths is computed from only the vertices in $Q \subseteq D$, the additional complexity of Steps 102-106 is O($|Q|/|\phi_D|$) Since in most cases, $|Q|/|D| << 1$, this is more efficient than just using Johnson's algorithm for all-pair-shortest-paths, that has complexity O($|D| \cdot |\phi_D|$).

The complexity of Steps 108-112 is LAP($|L|$, $|\phi_Q|+|\phi_L|$). Finally, Steps 114-116 incurs another NCD($|D|$, $|\phi_D|$) complexity, since at most $|Q|$ constraints are added as $x = \rho_L(x)$ constraints to $\phi_D$. Thus, the present system is able to solve the difference and non-difference constraints using linear or near-linear space.

The following describes the extension of the basic SLA-SAT process to generate the equalities between variables implied by the constraint $\phi$. Equality generation is useful for combining the linear arithmetic decision procedure with other decision procedures in the Nelson-Oppen combination framework. The description sets forth the requirements from the difference and the non-difference decision procedures in SLA-SAT to generate all equalities implied by $\phi$.

In the following description it is assumed that $\phi$ is satisfiable. Previously used notations (e.g., $\phi_D$, $\phi_L$, etc.) are used below as well. Referring to the flowchart of FIG. 2, the steps of the procedure include the following. In step 120, $\phi_Q$ is generated. In step 122, $\phi_Q \wedge \phi_L$ is solved using linear arithmetic decision procedure. In step 124, the set of equalities is generated (with offsets) implied by $\phi_Q \wedge \phi_L$:

$$\epsilon_1 \doteq \{x = y + c | x \in L, y \in L, \text{ and } (\phi_Q \wedge \phi_L)) \Rightarrow x = y + c\}, \quad (2)$$

from the linear arithmetic decision procedure.

In step 126, $\epsilon_2 \subseteq \epsilon_1$ is designated as the set of equalities over the variables in Q:

$$\epsilon_2 \doteq \{x = y + c | x \in Q, y \in Q, x = y + c \in \epsilon_1\} \quad (3)$$

In step 128, all the implied equalities (with offset) are generated from $\epsilon_2$ (interpreted as a formula by conjoining all the equalities in $\epsilon_2$) and $\phi_D$:

$$\epsilon_3 \doteq \{x = y + c | x \in D, y \in D, (\phi_D \wedge \epsilon_2) \Rightarrow x = y + c\} \quad (4)$$

In step 130, the set of equalities $\epsilon$ implied by $\epsilon_1$ and $\epsilon_3$ is the set of equalities implied by $\phi$:

$$\epsilon \doteq \{x = y | x \in X, y \in X, (\epsilon_1 \wedge \epsilon_3) \Rightarrow x = y\} \quad (5)$$

In step 132, the set of equalities $\epsilon$ may be stored by the computing system environment in step 132 and reported in step 134.

A proof for the equality generating process is set forth below. First, a few intermediate lemmas are set forth and proofs provided.

For a set of linear arithmetic constraints $A \dot= \{e_1, \ldots, e_n\}$, a linear combination of A is defined to be a summation $\Sigma_{e_j \in A} c_j \cdot e_j$, such that each $c_j \in Q$ and non-negative.

Lemma 2. Let $\phi_A$ and $\phi_B$ be two sets of linear arithmetic constraints over variables in A and B respectively. If u is a linear arithmetic term over A\B and v is a linear arithmetic term over B such that $\phi_A \wedge \phi_B \Rightarrow u \bowtie v$, then there exists a term t over A∩B such that:

1. $\phi_A \Rightarrow u \bowtie t$, and
2. $\phi_B \Rightarrow t \bowtie v$, where $\bowtie$ is either $\leq$ or $\geq$ The proof is as follows. For the case where $\bowtie$ is $\leq$ (the reasoning is the same for $\geq$), let $\Phi_A \dot= \{e_1, \ldots e_n\}$ and $\Phi_B \dot= \{e'_1, \ldots, e'_m\}$ be the set of constraints. As $\Phi_A \wedge \Phi_B \Rightarrow u \leq v$, there exists a set of non-negative constants $\{c_1, \ldots, c_n, c'_1, \ldots, c'_m\}$ such that:

$$u \leq v \equiv \sum_{e_j \in \phi A-} cj \cdot ej + \sum_{e'_j \in \phi B} c'_j \cdot e'_j$$

Since the set of constraints in $\Phi_A$ and $\Phi_B$ only share variables over A∩B, it can be seen that $\Sigma_{e_j \in \Phi_A} c_j \cdot e_j \equiv (u-t \leq 0)$ and $\Sigma_{e'_j \in \Phi_B} c'_j \cdot e'_j \equiv (-v+t \leq 0)$, where t is a linear term over A∩B. Therefore, $\phi_A \Rightarrow u \leq t$ and $\phi_B \Rightarrow t \leq v$. This lemma is a variation of the lemma that appears in G. Yorsh and M. Musuvathi, "A combination method for generating interpolants," In *CADE 05: Conference on Automated Deduction*, LNCS 3632, pages 353-368. Springer-Verlag, 2005, which publication is incorporated by reference herein in its entirety.

For the set of satisfiable difference constraints $\phi_D \dot= \{e_1, \ldots, e_n\}$, a linear combination $\Sigma_{e_j \in \phi D} c_j \cdot e_j$ is said to contain a cycle (respectively a path from x to y) if there exists a subset of constraints in $\phi_D$ with positive coefficients (i.e., $c_j > 0$) in the derivation, such that they form a cycle (respectively a path from x to y) in the graph induced by $\phi_D$.

Lemma 3. For any term t over D, if $\phi_D \Rightarrow t \leq 0$, then there exists a linear derivation of $t \leq 0$ that does not contain any cycles.

The proof is as follows. Assuming that the derivation of $t \leq 0$ from $\Phi_D$ contains $A \dot= \{e'_1, \ldots, e'_m\} \subseteq \phi_D$, that appear with non-zero coefficients $c'_1, \ldots c'_m$ respectively, and $[e'_1, \ldots e'_m]$ forms a cycle in the graph induced by $\phi_D$.

Since $\phi_D$ is satisfiable, any cycle in the graph has a non-negative weight. Therefore, $\Sigma_{e_j \in A} c'_j \cdot e'_j \equiv d$, for some $d \geq 0$. Hence, $t \leq 0$ can be derived by reducing the coefficients of each $e'_j \in A$ by the minimum $c'_j$ in this set and adding the constraint $0 \leq 1$ with the same coefficient. This process may be repeated until there are no cycles in the derivations.

Lemma 4 (Difference-Bounds Lemma). Let $x, y \in D\backslash Q$, t be a term over Q, and $\phi_D$ a set of difference constraints.

1. If $\phi_D \Rightarrow x \bowtie t$, then there exists terms $u_1, u_2, \ldots, u_n$ such that all of the following are true:
   (a) Each $u_i$ is of the form $x_i + c_i$ for a variable $x_i \in Q$ and a constant $c_i$,
   (b) $\phi_D \Rightarrow \wedge_i x \bowtie u_i$, and
   (c) $\phi_D \Rightarrow 1/n. \Sigma_i u_i \bowtie t$
2. If $\phi_D \Rightarrow x - y \bowtie t$, then there exists terms $u_1, u_2, \ldots, u_n$ such that all of the following are true:
   (a) Each $u_i$ is either of the form $c_i$ or $x_i - y_i + c_i$ for variables $x_i, y_i \in Q$ and a constant $c_i$,
   (b) $\phi_D \Rightarrow \wedge_i x - y \bowtie u_i$, and
   (c) $\phi_D \Rightarrow 1/n. \Sigma_i u_i \bowtie t$ where $\bowtie$ is one of $\leq$ or $\geq$.

The proof of this lemma is as follows. The proof makes use of a novel concept to split a linear combination of difference constraints to yield the desired results.

The proof is illustrated for the cases when $\bowtie$ is $\leq$. The case for $\geq$ is similar. Two observations are made that are used for proving both parts of the lemma:

1. It is well known that for a set of linear constraints $\phi \dot= \{e_1, \ldots, e_k\}$ over Q, and a linear arithmetic constraint $\psi$, $\phi \Rightarrow \psi$ if and only if there exists a set of non-negative constants $\{m_1, \ldots, m_k\}$ in Q, such that:

$$\psi \equiv \sum_{e_i \in \varphi} m_i \cdot e_i$$

This means that if $\phi \Rightarrow \psi$, then there exists a set of non-negative integer constants $\{n_1, \ldots, n_k\}$ and a non-negative constant n such that $$n \cdot \psi \equiv \sum_{e_i \in \varphi} n_i \cdot e_i$$

Let $p_i/q_i$ be the rational representation of $m_i$. The constant n is simply the least common multiple of $q_1, \ldots, q_k$, and each $n_i$ is $n.p_i/q_i$.

For the set of difference constraints $\phi_D \dot= \{e_1, \ldots, e_k\}$, an integer linear combination of the constraints $\Sigma_{e_i \in \phi D} n_i \cdot e_i$ (where each $n_i$ is a non-negative constant in Z), can be represented as a multi-graph G, where there are $n_i$ (possibly 0) copies of the edge corresponding to $e_i$. For any vertex $z \in D$, the indegree(z) is the number of edges of the form $z - w_i \leq c_i$, where $w_i \in D$; similarly, the outdegree(z) is the number of edges of the form $w_i - z \leq c_i$ in the graph.

Case 1: Case 1 of the Lemma 4 may be proved as follows. Assume that $\Phi_D \Rightarrow x \leq t$, for some $x \in D\backslash Q$. Therefore, there exists non-negative integer constants $\{n_1, \ldots n_k\}$ and n, such that:

$$\left(\sum_{e_i \in \phi D} n_i \cdot e_i\right) \equiv (n \cdot x - n \cdot t \leq 0)$$

Referring now to the multigraph G induced by the linear combination $\Sigma_{e_i \in \phi D} n_i \cdot e_i$, it may be seen that the following statements are true for this graph G:

For any vertex $z \in (D\backslash Q)\backslash\{x\}$, indegree $(z)$ = outdegree $(z)$.
For the vertex x, indegree $(x)$ – outdegree $(x)$ = n.

Since $\phi_D$ is satisfiable and it has been assumed that the derivation is irredundant, it can be assumed (using Lemma 3) that there are no cycles in this multigraph.

A process of iteratively enumerating a set of n paths from the graph G will now be described, where each path corresponds to a constraint $x \leq x_i + c_i$, where $x_i \in Q$. After each path has been enumerated, the edges in the path are removed from the graph. For each path, an edge $x \leq z_1 + d_1$ is taken and extended until a vertex is reached in Q. This is possible since all the vertices in $(D\backslash Q)\backslash\{x\}$ have equal indegree and outdegree, and there are no cycles. Let the path enumerated have the sequence of edges $x \leq z_1 + d_1$, $z_1 \leq z_2 + d_2$, ... $z_1 \leq x_i + c_i$, where $x_i \in Q$. Observe that the indegree and outdegrees of the intermediate vertices $\{z_i\}$ remain equal even after the path has been removed, and the measure indegree (x) – outdegree (x) decreases by 1.

By repeating the above process n times, a set of n paths may be obtained that sum up to $x \leq x_i + c_i$, for $1 \leq i \leq n$, where $x_i \in Q$. Let G' be the final graph obtained after removing the paths from G. Since the graph G represented the sum $n.x - n.t$, and the n paths represent the sum $n.x - \Sigma_i(x_i + c_i)$, the constraints in the graph G' represent the sum $\Sigma_i(x_i + c_i) - n.t$. Moreover since each constraint is $\leq 0$, the resultant constraints are $\leq 0$.

Hence, the linear combination $\Sigma_{ei \in \phi D} n_i . e_i$ may be split into two linear combinations that represent: (a) $x \leq x_i + c_i$, for $1 \leq i \leq n$, such that $x_i \in Q$; and (b) $\Sigma_i(x_i + c_i) - n.t \leq 0$ or $1/n. \Sigma_i(x_i + c_i) \leq t$. The terms $x_i + c_i$ are the desired $u_i$s in the case 1 of the Lemma.

Case 2: The second case is similar to the first case in many respects and uses the same methodology to split the linear combination into two linear combinations.

Let $\phi_D = \{e_1, \ldots e_k\}$. Since $\phi_D \Rightarrow x - y \leq t$, there exists non-negative integer constants $\{n_1, \ldots, n_k\}$ and n such that:

$$\left(\sum_{e_i \in \phi D} n_i \cdot e_i\right) \equiv (n \cdot x - n \cdot y - n \cdot t \leq 0)$$

Once again, looking at the graph G induced by the linear combination, this graph now has the following properties:

For the vertex x, indegree (x)−outdegree (x)=n.

For the vertex y, outdegree (y)−indegree (y)=n.

For any other vertex $z \in (D\backslash Q)\backslash\{x,y\}$, indegree (z)=outdegree (z).

There are no cycles in the graph G.

The paths from x may now be enumerated starting with edges of the form $x \leq z_i + c_i$, until either (i) a vertex $x_i \in Q$ or (ii) y is reached. Similarly, the paths (ending at y) from y may be enumerated starting with edges of the form $z_i + c_i \leq y$, until (i) a vertex $y_i \in Q$ or (ii) x is reached.

The paths from y to x are enumerated first. Each of these paths represent the constraint $x - y \leq c_i$ for some constant $c_i$ representing the weight of the path. Removal of these paths reduce the indegree (x)−outdegree (x) and the outdegree (y)−indegree (y) measure by 1, keeping the indegree (z)=outdegree (z) for all other $z \in D\backslash Q$. Let there be m such paths between y and x.

From the remainder graph, n−m paths may be enumerated, representing $x \leq x_1 + c'_i$ and $y_i + d'_i \leq y$ for $1 \leq i \leq n-m$ where $\{x_i, y_i\} \subseteq Q$. For each $1 \leq i \leq n-m$, the sum of the constraints representing $x \leq x_i + c'_i$ and $y_i + d'_i \leq y$ will yield the desired constraints $x - y \leq x_i - y_i + c_i$, where $c_i = (c'_i + d'_i)$. Therefore $\phi_D$ imply $x - y \leq u_i$, where $u_i \in \{c_i, x_i - y_i + c_i\}$ for $1 \leq l \leq n$. Moreover, since the sum of the constraints removed from G sums up to $n.x - n.y - \Sigma_i u_i$ the sum of the remaining constraints in the graph would yield $\Sigma_i u_i - n.t \leq 0$, or $1/n. \Sigma_i u_i \leq t$.

Lemma 5 (Sandwich Lemma). Let $I_1, I_2, \ldots I_m$ and $u_1, u_2, \ldots u_n$ be terms such that $\wedge_{i,j} I_i \leq u_j$. Let $I_{avg} = 1/m. \Sigma_i I_i$ and $u_{avg} = 1/n. \Sigma_j u_j$ be the respective average of these terms. If I and u are terms such that $I \leq I_{avg}$ and $u_{avg} \leq u$, then $$l = u \Rightarrow \bigwedge_{i,j} l_i = u_j = l$$

The proof is as follows. Let I=u. To prove by contradiction, without loss of generality, assume $I_1 < u_1$. Thus, $n.I_1 < \Sigma_j u_j$ and $n.I_i \leq \Sigma_j u_j$ for $1 < i \leq m$. Therefore, $n. \Sigma_i < m. \Sigma_j u_j$, which implies that I<u, a contradiction. As a result, $I_i = u_j$ for every i, j. Moreover, $I_{avg} = u_{avg} = I_1$. Thus, $I = I_1$ proving the lemma.

Given the above lemmas, the correctness of the equality propagation process may be proven. That is, that for two variables $x \in X$ and $y \in X$, $\phi \Rightarrow x = y$ if and only if $x = y \in \epsilon$.

The proof is as follows. Case 1: The easiest case to handle is the case when both x; $y \in L$. Thus, $\exists D\backslash L: \phi = \phi_Q \wedge \phi_L \Rightarrow x = y$. Therefore, the equality x=y is present in $\epsilon_1$ and thus in $\epsilon$.

Case 2: Consider the case when one of the variables, for example, $x \in D\backslash L$ while $y \in L$. That yields $\phi \Rightarrow x \leq y \wedge x \geq y$. Applying Lemma 2 twice, there exists terms t; $t^1 \in Q$ such that:

$$\phi_D \Rightarrow x \leq t \wedge x \geq t^1 \quad (6)$$

$$\phi_L \Rightarrow t \leq y \wedge t^1 \geq y \quad (7)$$

However, $\phi_D \wedge \phi_L \Rightarrow x = y = t = t^1$. As t, $t^1 \in Q$, that yields:

$$\phi_Q \wedge \phi_L \Rightarrow t = t^1 = y. \quad (8)$$

Using Lemma 4 twice on Equation 6, there exists terms $u_1, \ldots, u_m$ and terms $I_1, \ldots, I_n$ all of the form v+c for a variable $v \in Q$ and a constant c such that:

$$\phi_D \Rightarrow \bigwedge_i x \leq u_i \wedge 1/m \cdot \sum_i u_i \leq t$$

$$\phi_D \Rightarrow \bigwedge_j x \geq l_j \wedge 1/n \cdot \sum_j l_j \leq t'$$

As the terms $u_i$ and $I_j$ are terms over Q, that yields:

$$\phi_Q \Rightarrow \bigwedge_{i,j} l_j \leq u_i \wedge 1/m \cdot \sum_i u_i \leq t \wedge 1/n \cdot \sum_j l_j \geq t'$$

Using Lemma 5 and Equation 8, that yields:

$$\phi_Q \wedge \phi_L \Rightarrow \bigwedge_{i,j} l_j = u_i = t = t' - y$$

All of the above equalities belong to $\epsilon_1$. Moreover, the equalities between $I_j$ and $u_i$ are present in $\epsilon_2$. Thus, the equality $x = I_j = u_i$ is present in $\epsilon_3$. Thus x=y is in $\epsilon$.

Case 3: The final case involves the case when x, y are both in $D\backslash L$. The proof is similar to Case 2. $\phi \Rightarrow x - y \leq 0 \wedge x - y \geq 0$. Applying Lemma 2 twice, there exists terms t; $t^1 \in Q$ such:

$$\phi_D \Rightarrow x-y \leq t \wedge x-y \geq t^1 \quad (9)$$

$$\phi_L \Rightarrow t \leq 0 \wedge t^1 \leq 0 \quad (10)$$

However, $\phi_D \wedge \phi_L \Rightarrow x - y = 0 = t = t^1$. As t, $t^1 \in Q$, that results in:

$$\phi_Q \wedge \phi_L \Rightarrow t = t^1 = 0. \quad (11)$$

Using Lemma 4.2 above twice on Equation 9, there exists terms $u_1, \ldots, u_m$ and terms $I_1, \ldots, I_n$ all of the form u−v+c for a variable u, $v \in Q$ and a constant c such that:

$$\phi_D \Rightarrow \bigwedge_i x - y \leq u_i \wedge 1/m \cdot \sum_i u_i \leq t$$

$$\phi_D \Rightarrow \bigwedge_j x - y \geq l_j \wedge 1/n \cdot \sum_j l_j \leq t'$$

As the terms $u_i$ and $l_j$ are terms over Q, that results in:

$$\phi_Q \Rightarrow \bigwedge_{i,j} l_j \le u_i \wedge 1/m \cdot \sum_i u_i \le t \wedge 1/n \cdot \sum_j l_j \ge t'$$

Using Lemma 5 and Equation 11, that yields:

$$\phi_Q \wedge \phi_L \Rightarrow \bigwedge_{i,j} l_j = u_i = t = t' = 0$$

All of the above equalities belong to $\epsilon_1$. Moreover, the equalities between $l_j$ and $u_i$ are present in $\epsilon_2$. Thus, the equality $x=l_j=u_i$ is present in $\epsilon_3$. Thus $x=y$ is in $\epsilon$.

An instantiation of the SLA framework is now described, using the Simplex algorithm for solving general linear arithmetic constraints. The Simplex algorithm (although having a worst case exponential complexity) is a practical method for solving linear arithmetic constraints, when the variables are interpreted over rationals. Although Simplex is incomplete for integers, various heuristics have been devised to solve most integer queries in practice. See, for example, D. L. Detlefs, G. Nelson, and J. B. Saxe, "Simplify: A theorem prover for program checking," *Technical report*, HPL-2003-148, 2003, which publication is incorporated by reference herein in its entirety.

The following description demonstrates how to generate all equalities with offsets between a pair of variables, i.e. all the x=y+c equalities implied by a set of linear constraints. The implementation of Simplex in Simplify can generate all possible x=y equalities implied by a set of constraints. The same Simplex implementation also allows generating all x=y+c, without any additional overhead (see, for example, Lemma 4 in Section 8 of the above-described incorporated publication to Detlefs, Nelson and Saxe, which almost immediately generalizes to give the desired result and which details the Simplex implementation in Simplify).

A Simplex tableau is used to represent a set of linear arithmetic constraints. As is known, a Simplex tableau is the main data structure in the implementation of the simplex algorithm using tables, or tableaux, to represent calculations and intermediate steps to completing a problem. The first step is to form an initial tableau. Each linear inequality is first converted to linear equality by the introduction of a slack variable. The Simplex tableau is a two-dimensional matrix that consists of the following:

Natural numbers n and m for the number of rows and columns for tableau respectively, and a column dcol, where $0 \le dcol \le m$. The columns 1 through dcol are called the dead columns.

The identifiers for the rows y[0], ..., y[n] and the identifiers for the columns x[1], ..., x[m], where each row or column identifier corresponds to a variable in the constraints, including the slack variables. The column 0 corresponds to the constant column. $u$, $u_1$ etc. are used to range over the row and column identifiers.

A two dimensional array of rational numbers a[0, 0], ..., a[n, m].

A subset of identifiers in y[0], ..., y[n], x[1], ..., x[m] also have a sign $\ge$.

Each row in the tableau represents a row constraint of the form:

$$y[i] = a[i, 0] + \sum_{1 \le j \le m} a[i, j] * x[j] \qquad (12)$$

For any identifier u with a sign $\ge$, the sign constraint represents u, $\ge 0$. Such an identifier u is said to be restricted. Finally, for all $1 \le j \le dcol$, x[j]=0, represents the dead column constraints.

The set of solutions to the row constraints and the dead column constraints, together termed as hyperplane constraints (i.e. ignoring the sign constraints) is referred to as hyperplane solution set (HPlaneSoln) and the set of solutions considering all the three types of constraints (together called the tableau constraints) is referred to as the tableau solution set (TablSoln).

The consistency of a Simplex Tableau may be tested. For a tableau T, a row variable y[i] is manifestly maximized if every non-zero entry a[i, j] for j>dcol, is negative and lies in a column whose variable x[j] is restricted. It may be seen that if a tableau is in a state where a restricted row variable y[i] is manifestly maximized, but a[i, 0]<0, then the set of constraints is infeasible. Such a tableau is called infeasible.

The sample point of a tableau corresponds to the solution obtained by setting each of the column variables x[j] to 0 and setting each of the y[i] to a[i, 0]. If a set of constraints is satisfiable, then there exists a configuration of the tableau, where the sample point satisfies and belongs to TablSoln.

Assuming a feasible tableau for a set of satisfiable constraints, the next consideration is reaching a feasible tableau after adding a new constraint. If the sample point after adding the new constraint does not satisfy all the sign constraints, then an operation called pivot can be repeatedly applied until (a) the sample point satisfies all the sign constraints, or (b) the tableau becomes infeasible (denotes unsatisfiability). The pivot operation swaps a row and a column of the tableau, but preserves each of the constraints. This is the high-level algorithm for checking the satisfiability of a set of constraints using Simplex.

A set of constraints is satisfiable if and only if there is a feasible tableau for the constraints. It is possible to further infer some classes of affine equalities from the Simplex tableau. In addition to being feasible, the tableau needs additional constraints to generate certain classes of equalities.

Two variables (row or column) $u_1$ and $u_2$ are defined to be manifestly equal in the tableau, if and only if either (i) both $u_1$ and $u_2$ are row variables and their rows are identical except for the dead columns, or (ii) both $u_1$ and $u_2$ are dead columns, or (iii) $u_1$ is a row variable y[i] and $u_2$ is a column variable x[j] and a[i, j]=1 is the only non-zero entry for row i outside the dead columns, or (iv) one of $u_1$ or $u_2$ is dead column variable, and the other is a row variable whose all non dead column entries are 0.

Assuming that the y[0] of the Simplex tableau is the special row Zero to denote the value 0, this row is identically 0 in every configuration of the tableau. Next, a tableau may be defined to be minimal if and only if every row or column variable u is either manifestly equal to Zero or has a positive value in some solution in TablSoln. As is known in the art, the Simplex implementation in Simplify provides an implementation of obtaining a minimal tableau for a set of constraints. The lemma that that may be used for minimal tableau is the following:

Lemma 6 (Lemma 2 in Detlefs, Nelson and Saxe, incorporated above). For a feasible and minimal tableau, and any affine function f over the row and column variables, $$f=0 \text{ over TablSoln} \Leftrightarrow f=0 \text{ over HPlaneSoln} \tag{13}$$

The generalization of Lemma 2 is now presented that allows equality generation to be extended to include offsets:

Lemma 7 (Generalization of Lemma 2 in Detlefs, Nelson and Saxe, incorporated above). For any two variables $u_1$ and $u_2$ in the tableau, the hyperplane constraints imply $u_1 = u_2 + c$, where c is a rational constant, if and only if at least one of the following conditions hold:

1. $u_1$ and $u_2$ are manifestly equal (in this case c=0), or
2. both $u_1$ and $u_2$ are row variables y[i] and y[j] respectively, and apart from the dead columns only differ in the constant column, such that a[i, 0]=a[j, 0]+c, or
3. $u_1$ is a row variable y[i], $u_2$ is a (possibly dead) column variable x[j], and the only non-zero entries apart from the dead columns in row i are a[i, 0]=c and a[i, j]=1.

The proof is as follows. Significant to the proof (as in Detlefs, Nelson and Saxe, incorporated above) is that each of the row or column variable can be expressed as an affine combination over the live (non-dead) column variables. For each row $0 \leq i \leq n$:

$$y[i]=a[i, 0]+\Sigma_{dcol<j\leq m}a[i, j]*x[j]. \tag{14}$$

Similarly, for each live column dcol $<j \leq m$ $$x[j]=0+\Sigma_{dcol<k\leq m}\delta_{j,k}*x[k]. \tag{15}$$

where $\delta_{j,k}=1$ if j=k and 0 otherwise.

Finally, for any dead column in $0 \leq j \leq dcol$ $$x[j]=0+\Sigma_{dcol<k\leq m}0*x[k]. \tag{16}$$

Since the variables in the live column are independent and can assume any arbitrary values, two variables $u_1$ and $u_2$ differ by a constant c (including c=0) if and only if the coefficients of the live column variables are identical in the two variables, and only the constant column differs by c. Note that the Lemma 2 in Detlefs, Nelson and Saxe, incorporated above, is restricted to c=0.

Therefore, obtaining the minimal tableau is sufficient to derive even x=y+c facts from Simplex. This is noteworthy because the Simplex implementation does not incur any more overhead in generating these more general equalities than simple x=y equalities. The only additional work that has to be done is to identify the pairs $u_1$ and $u_2$ that satisfy Lemma 7.

The following describes Inferring Equalities from NCD. The process for generating implied equalities between variables by the input formula φ is described above. This process requires generating equalities of the form x=y+c from the NCD component of SLA. The lemma is provided here.

Lemma 8 (Lemma 2 in Lahiri and Musuvathi, previously incorporated). An edge e in $G_\varphi$ representing y≤x+c, $e_i$ can be strengthened to represent y=x+c (called an equality-edge), if and only if e lies in a cycle of weight zero.

Hence, using Lemma 8, Lemma 7 and the theory set forth above that, two variables x∈X and y∈X, φ⇒x=y if and only if x=y∈ε, this provides a complete equality generating decision procedure over rationals.

The SLA decision procedure has been implemented in the Zap theorem prover (described for example in T. Ball, S. K. Lahiri, and M. Musuvathi. Zap: Automated theorem proving for software analysis. In *Logic for Programming, Artificial Intelligence, and Reasoning,* 12th International Conference, LPAR 2005, volume 3835 of *LNCS,* pages 2-22. Springer-Verlag, 2005, which publication is incorporated by reference herein in its entirety). The implementation uses the Bellman-Ford algorithm as the NCD algorithm and the Simplex implementation for the non-difference constraints.

Figure 3A:
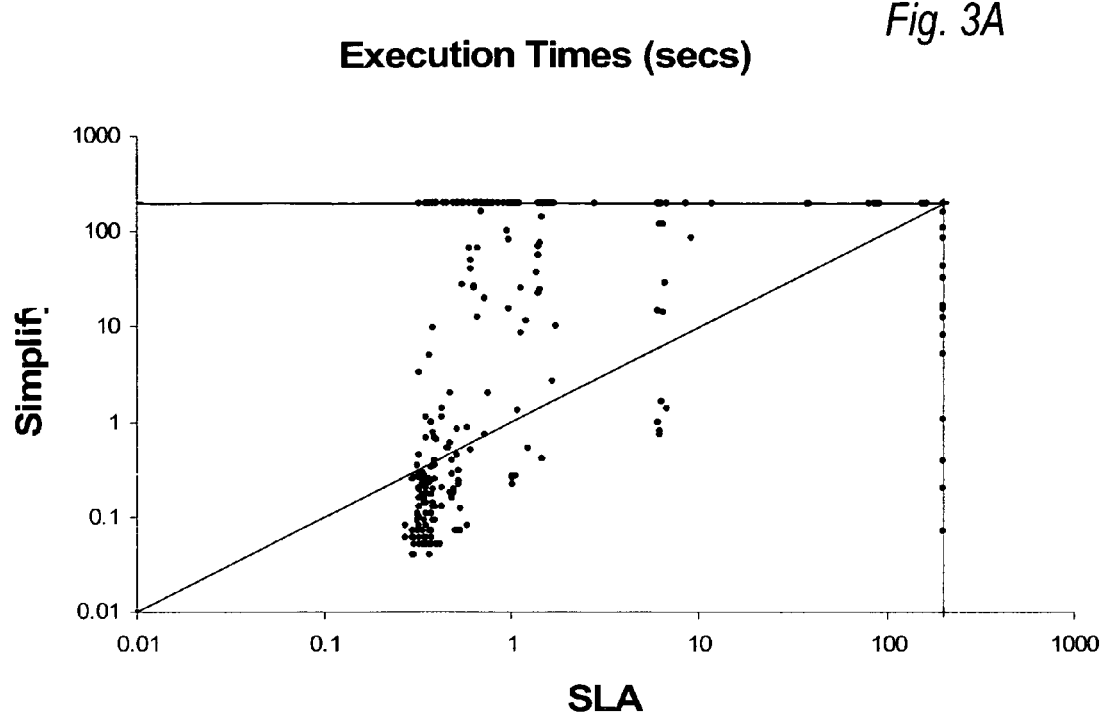
FIGS. 3A and 3B are graphs showing a comparison of the process of the present system with two different implementations for solving linear arithmetic constraints: (i) Simplify-Simplex: the linear arithmetic solver in the Simplify theorem prover, and (ii) Zap-UTVPI: an implementation of UTVPI decision procedure in Zap.
Figure 3B:
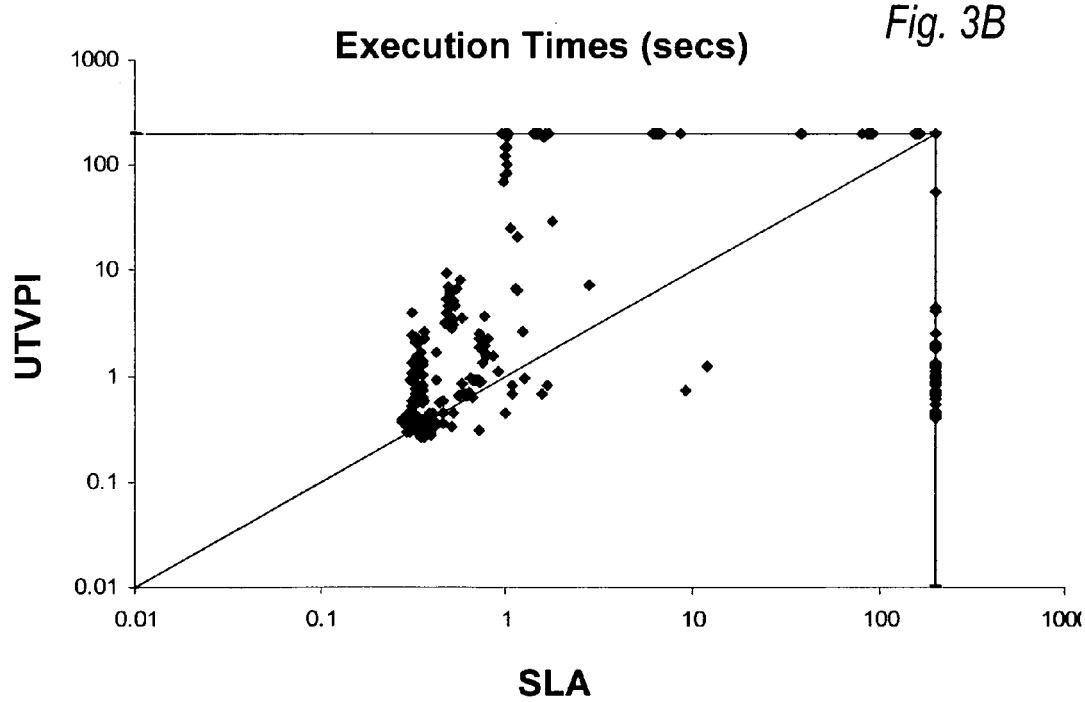

FIGS. 3A and 3B show preliminary results comparing the process of the present system with two different implementations for solving linear arithmetic constraints. FIG. 3A shows the present system compared against Simplify-Simplex: the linear arithmetic solver in the Simplify theorem prover. FIG. 3B shows the present system compared against Zap-UTVPI: an implementation of UTVPI decision procedure in Zap. The Zap-UTVPI decision procedure is shown for example in W. Harvey and P. J. Stuckey, "A unit two variable per inequality integer constraint solver for constraint logic programming," In *Proceedings of the 20th Australasian Computer Science Conference (ACSC '97),* pages 102-111, 1997, and J. Jaffar, M. J. Maher, P. J. Stuckey, and H. C. Yap, "Beyond finite domains," In *PPCP 94: Principles and Practice of Constraint Programming,* LNCS 874, pages 86-94. Springer-Verlag, 1994, both of which publications are incorporated by reference herein in their entirety.

From FIG. 3A, it can be seen that the SLA implementation in Zap outperforms the Simplex implementation in Simplify, on a large number of examples. Simplify may be faster on smaller examples, but this can be attributed to the C# implementation of Zap.

It may also be concluded from FIG. 3A that the SLA process is able to solve several cases where Simplex gives an integer overflow. This is because Simplex algorithm performs a lot of multiplication and divisions of the coefficients in the Simplex tableau, and can cause integer overflows very often on large problems. However, by only using Simplex for solving a few constraints in SLA, an integer overflow may be avoided in most cases.

From FIG. 3B, it can be seen that the negative cycle detection based algorithm+Simplex based SLA implementation outperforms a transitive-closure based algorithm capable of handling just the UTVPI fragment of linear arithmetic. The main difference in performance comes from the linear-space negative cycle detection algorithm, compared to quadratic space complexity of the transitive closure algorithm.

The results also indicate that a combination procedure (such as outlined in Hossein M. Sheini and Karem A. Sakallah, "A scalable method for solving satisfiability of integer linear arithmetic logic," In *Theory and Applications of Satisfiability Testing,* 8th International Conference, SAT 2005, volume 3569 of *LNCS,* pages 241-256. Springer, 2005) based on transitive closure is less efficient than the negative cycle detection+Simplex based SLA process.

While the Simplex algorithm has been described above as a useful algorithm for use in the present system for solving sparse linear arithmetic constraints, other known methods may be used, including for example Variable Elimination Methods (Hodes, Fourier-Motzkin, etc.), Shostak's loop residues and the above described separation theory by Bellman and Pratt.

Figure 4:
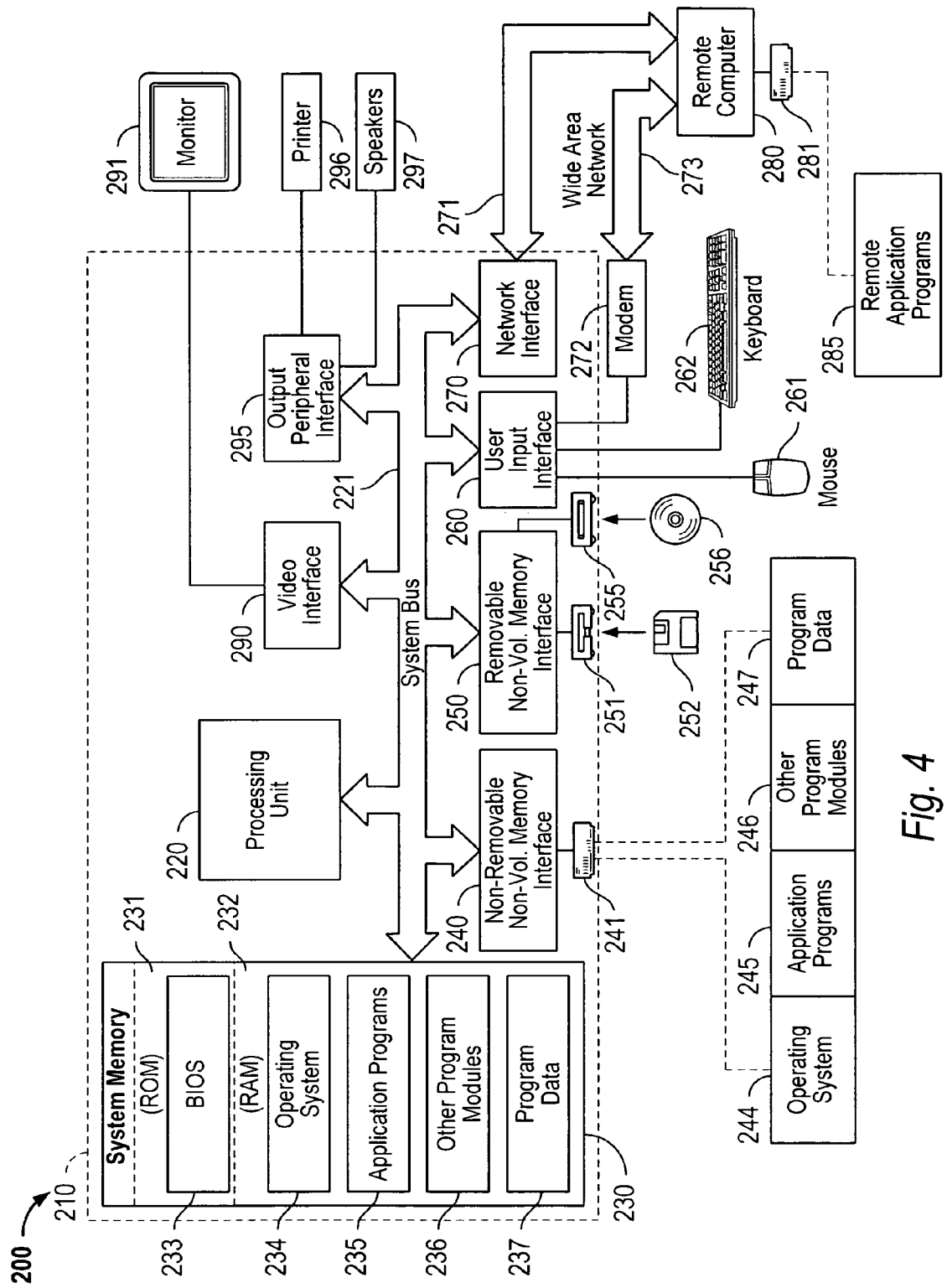
FIG. 4 is a block diagram of a computing system environment capable of implementing the present system.

FIG. 4 illustrates an example of a suitable general computing system environment 200 that may comprise any processing device shown herein on which the inventive system may be implemented. The computing system environment 200 is only one example of a suitable computing environment and is not intended to suggest any limitation as to the scope of use or functionality of the inventive system. Neither should the computing system environment 200 be interpreted as having any dependency or requirement relating to any one or combination of components illustrated in the exemplary computing system environment 200.

The inventive system is operational with numerous other general purpose or special purpose computing systems, environments or configurations. Examples of well known computing systems, environments and/or configurations that may be suitable for use with the inventive system include, but are not limited to, personal computers, server computers, multiprocessor systems, microprocessor-based systems, set top boxes, programmable consumer electronics, network PCs, minicomputers, mainframe computers, laptop and palm computers, hand held devices, distributed computing environments that include any of the above systems or devices, and the like.

With reference to FIG. 4, an exemplary system for implementing the inventive system includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 may include a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 230 includes computer storage media in the form of volatile and/or nonvolatile memory such as ROM 231 and RAM 232. A basic input/output system (BIOS) 233, containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 4 illustrates operating system 234, application programs 235, other program modules 236, and program data 237.

The computer 210 may also include other removable/non-removable, volatile/nonvolatile computer storage media. By way of example only, FIG. 4 illustrates a hard disc drive 241 that reads from or writes to non-removable, nonvolatile magnetic media and a magnetic disc drive 251 that reads from or writes to a removable, nonvolatile magnetic disc 252. Computer 210 may further include an optical media reading device 255 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 241 is typically connected to the system bus 221 through a non-removable memory interface such as interface 240, magnetic disc drive 251 and optical media reading device 255 are typically connected to the system bus 221 by a removable memory interface, such as interface 250.

The drives and their associated computer storage media discussed above and illustrated in FIG. 4, provide storage of computer readable instructions, data structures, program modules and other data for the computer 210. In FIG. 4, for example, hard disc drive 241 is illustrated as storing operating system 244, application programs 245, other program modules 246, and program data 247. These components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and a pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus 221, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 4. The logical connections depicted in FIG. 4 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communication over the WAN 273, such as the Internet. The modem 272, which may be internal or external, may be connected to the system bus 221 via the user input interface 260, or other appropriate mechanism. In a networked environment, program modules depicted, relative to the computer 210, or portions thereof, may be stored in the remote memory storage device. By way of example, and not limitation, FIG. 4 illustrates remote application programs 285 as residing on memory device 281. It will be appreciated that the network connections shown are exemplary and other means of establishing a communication link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

We claim:

1. A computer implemented method for solving linear arithmetic constraints including difference constraints and non-difference constraints, the computer implemented method comprising the steps of:
   a) solving for the difference constraints;
   b) solving for the non-difference constraints, wherein step a) retains polynomial complexity;
   c) reporting the result solved for in at least of steps a) and b); and
   d) generating satisfying assignments for the variables in the difference and non-difference constraints in the event a satisfying assignment exists.

2. A computer implemented method as recited in claim 1, wherein the time and space complexity of said step b) of solving for the non-difference constraints is determined by the difference constraint component solved in said step a) for sparse linear arithmetic constraints.

3. A computer implemented method as recited in claim 1, further comprising the step c) of generating equalities over variables that are implied by the difference and non-difference constraints.

4. A computer implemented method as recited in claim 1, wherein said step of generating satisfying assignments for the variables in the difference and non-difference constraints is performed using a negative cycle detection algorithm.

5. A computer implemented method as recited in claim 1, wherein steps a) and b) can decide m difference constraints on n variables in at most O(n.m) time.

6. A computer implemented method as recited in claim 1, wherein a space complexity of said steps a) and b) is linear or approximately linear in the size of the difference constraints.

7. A computer implemented method as recited in claim 1, wherein steps a) and b) can decide m difference constraints on n variables in O(n+m) space complexity.

8. One or more processor readable storage devices having processor readable code stored on said processor readable storage devices, said processor readable code for programming one or more processors to perform a method for solving linear arithmetic constraints including difference constraints and non-difference constraints, the computer implemented method comprising the steps of:
   a) checking the satisfiability of the difference constraints using a negative cycle detection algorithm;
   b) indicating when the difference constraints are unsatisfiable;
   c) describing a length of a shortest path from vertices corresponding to variable x to y in the graph induced by the difference constraints in the event the difference constraints are satisfiable in said step b);
   d) generating a set of difference constraints over the variables in common between the difference constraints and the non-difference constraints; and
   e) checking the satisfiability of $\phi_L \wedge \phi_Q$, where $\phi_L$ represents the non-difference constraints and $\phi_Q$ represents the difference constraints in common between the difference constraints and the non-difference constraints; and
   f) reporting the result of said step e) checking the satisfiability of $\phi_L \wedge \phi_Q$.

9. One or more processor readable storage devices as recited in claim 8, further comprising the step d) of generating satisfying assignments for the variables in the difference and non-difference constraints in the event a satisfying assignment exists in said step c).

10. One or more processor readable storage devices as recited in claim 8, wherein step d) retains polynomial complexity.

11. One or more processor readable storage devices as recited in claim 8, wherein a space complexity of said step d) is linear or approximately linear in the size of the difference constraints.

12. One or more processor readable storage devices as recited in claim 8, wherein said step e) is performed using a linear arithmetic decision procedure.

13. One or more processor readable storage devices as recited in claim 12, wherein said step linear arithmetic decision procedure uses the Simplex algorithm.

14. One or more processor readable storage devices as recited in claim 8, wherein said step b) is performed using a negative cycle detection algorithm.

15. One or more processor readable storage devices as recited in claim 8, further comprising the step of generating implied equalities over variables that are implied by the difference and non-difference constraints.

16. A computing system environment configured, at least in part, to perform a method of solving linear arithmetic constraints including difference constraints and non-difference constraints, the computer implemented method comprising the steps of:
   a) checking the satisfiability of the difference constraints using a negative cycle detection algorithm;
   b) describing a length of a shortest path from vertices corresponding to variable x to y in the graph induced by the difference constraints in the event the difference constraints are satisfiable in said step a);
   c) generating a set of difference constraints over the variables in common between the difference constraints and the non-difference constraints;
   d) checking the satisfiability of $\phi_L \wedge \phi_Q$, where of $\phi_L$ represents the non-difference constraints and $\phi_Q$ represents the difference constraints in common between the difference constraints and the non-difference constraints;
   e) generating implied equalities over variables that are implied by the difference and non-difference constraints;

f) generating satisfying assignments for the variables in the difference and non-difference constraints in the event a satisfying assignment exists in said step d).

17. A computing system environment as recited in claim 16, wherein said step d) is performed using a linear arithmetic decision procedure.

18. A computing system environment as recited in claim 16, wherein step e) of generating equalities uses the relationship that, for rational arithmetic, exchanging x=y+c facts is sufficient to generate equalities from the combined procedure.

19. A computing system environment as recited in claim 16, wherein a space complexity of the method for solving linear arithmetic constraints is linear or approximately linear in the size of the difference constraints.

* * * * *

UNITED STATES PATENT AND TRADEMARK OFFICE
CERTIFICATE OF CORRECTION

PATENT NO. : 7,596,534 B2  Page 1 of 1
APPLICATION NO. : 11/455308
DATED : September 29, 2009
INVENTOR(S) : Musuvathi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 651 days.

Signed and Sealed this

Twenty-eighth Day of September, 2010

David J. Kappos
*Director of the United States Patent and Trademark Office*